United States Patent [19]

Sowman

[11] Patent Number: 4,929,578
[45] Date of Patent: May 29, 1990

[54] REFRACTORY FIBERS OF ALUMINA AND ORGANIC RESIDUE

[75] Inventor: Harold G. Sowman, St. Paul, Minn.

[73] Assignee: Minnesota Mining and Manufacturing Company, St. Paul, Minn.

[21] Appl. No.: 265,758

[22] Filed: Nov. 1, 1988

Related U.S. Application Data

[63] Continuation-in-part of Ser. No. 49,017, May 7, 1987, Pat. No. 4,801,562, which is a continuation-in-part of Ser. No. 854,319, Apr. 21, 1986, abandoned.

[51] Int. Cl.$^5$ .............................................. C04B 35/02
[52] U.S. Cl. ........................................ 501/95; 264/63; 264/65
[58] Field of Search ...................... 501/95; 264/63, 65

[56] References Cited

U.S. PATENT DOCUMENTS

| | | | |
|---|---|---|---|
| 2,828,484 | 3/1958 | Skellett | 343/18 |
| 2,875,435 | 8/1958 | McMillan | 343/18 |
| 2,877,286 | 3/1959 | Vance et al. | 174/35 |
| 2,923,934 | 2/1960 | Halpern | 343/18 |
| 2,996,710 | 8/1961 | Pratt | 343/18 |
| 3,185,986 | 5/1965 | McCaughna et al. | 343/18 |
| 3,322,865 | 5/1967 | Blaze | 264/5 |
| 3,440,655 | 4/1969 | Wesch et al. | 343/18 |
| 3,441,933 | 4/1969 | Tuinila et al. | 343/18 |
| 3,503,765 | 3/1971 | Blaze | 106/65 |
| 3,568,195 | 3/1971 | Wesch et al. | 343/18 |
| 3,568,196 | 3/1971 | Bayrd et al. | 343/18 |
| 3,760,049 | 9/1973 | Borer et al. | 264/57 |
| 3,788,885 | 1/1974 | Birchall et al. | 117/126 |
| 3,795,524 | 3/1974 | Sowman | 106/65 |
| 3,950,478 | 4/1976 | Kenworthy et al. | 264/234 |
| 3,982,955 | 9/1976 | Mansmann et al. | 106/307 |
| 4,001,827 | 1/1977 | Wallin et al. | 343/18 |
| 4,006,479 | 2/1977 | LaCombe | 343/18 |
| 4,008,299 | 2/1977 | Birchall et al. | 264/63 |
| 4,023,174 | 5/1977 | Wright | 343/18 |
| 4,047,965 | 9/1977 | Karst et al. | 106/65 |
| 4,084,161 | 4/1978 | Manning et al. | 343/18 |
| 4,690,909 | 1/1987 | Okuno et al. | 501/90 |
| 4,701,426 | 10/1987 | Okuno et al. | 501/90 |
| 4,732,878 | 3/1988 | Everitt et al. | 501/100 |
| 4,801,562 | 1/1989 | Sowman et al. | 501/35 |

FOREIGN PATENT DOCUMENTS 1360200 7/1974 United Kingdom .

Primary Examiner—William R. Dixon, Jr.
Assistant Examiner—Chris Gallo
Attorney, Agent, or Firm—Donald M. Sell; Walter N. Kirn; Lorraine R. Sherman

[57] ABSTRACT

An amorphous organic-inorganic hybrid fiber consists essentially of 70 to 90 weight percent alumina and 10 to 30 weight percent of organic residue based on the total hybrid fiber composition. The organic residue can be derived, for example, from polyvinylpyrrolidone, polyvinyl alcohol, aluminum formoacetate or combinations thereof.

12 Claims, No Drawings

REFRACTORY FIBERS OF ALUMINA AND ORGANIC RESIDUE

This is a continuation-in-part of application Ser. No. 07/049,017, filed 5/7/87, U.S. Pat. No. 4,801,562 which was a continuation-in-part of application Ser. No. 06/854,319, filed 4/21/86 and now abandoned.

FIELD OF THE INVENTION

This invention relates to refractory fibers of alumina and phosphorus pentoxide and articles made therefrom. In another aspect, it relates to a process for the preparation of such refractory fibers. The fibers are useful in the manufacture of fire-resistant materials.

BACKGROUND ART

Ceramic fibers containing aluminum/phosphorus components are known in the art. They are known to be crystalline in structure which accounts for their friability. These fibers are not well suited for the manufacture of textile fabrics.

Ceramic fibers containing phosphates of aluminum have been disclosed. U.S. Pat. No. 4,008,299 teaches essentially crystalline filaments of aluminum phosphate. Various additives can provide some non-crystalline character. U.S. Pat. No. 3,788,885 discloses a process for binding inorganic fibrous materials which comprises applying a solution of a complex phosphate of aluminum to a fibrous material.

Polycrystalline oxide fibers, including $Al_2O_3 \cdot P_2O_5$, which melt above 1600° C are disclosed in U.S. Pat. No. 3,322,865.

$P_2O_5$ can be present as an additive in ceramic fibers. For example, polycrystalline alumina-silica fibers having as an additive 1 to 9% $P_2O_5$ are disclosed in U.S. Pat. No. 3,503,765. An alumina fiber having $P_2O_5$ present as an additive is taught in U.S. Pat. No. 3,950,478.

Br. patent specification 1,360,200 discloses a fiber comprising a metal compound and polyvinyl alcohol or partially hydrolyzed polyvinyl acetate and a process therefor.

GB 1,360,197 discloses fibers prepared from fiberizing compositions wherein an organic polymer is present in an amount less than 10 percent by weight of the metal compound.

U.S. Pat. No. 3,950,4781 discloses fibers wherein a polymeric component in a precursor fiberizing composition is present in an amount less than 10 percent by weight based on the metal oxide present in the final completely oxide fiber.

SUMMARY OF THE INVENTION

Briefly, the present invention provides an amorphous refractory fiber comprising a composition of 60 to 95 weight percent amorphous alumina and 40 to 5 weight percent amorphous phosphorus pentoxide based on the total oxide composition. The fibers, optionally, can comprise up to 20 percent by weight carbon from organic components based on the total fiber composition. The fibers are essentially free of silica.

The novel fired fiber of the invention comprises an amorphous homogeneous mixture of $Al_2O_3$ and $P_2O_5$.

The alumina-phosphorus pentoxide fibers of the invention are solid, smooth, and can be transparent to visible light. The fired alumina-phosphorus pentoxide fibers of the present invention have unusual textile handling properties in that they can be repeatedly rubbed between the fingers with little evidence of friability and are useful for the manufacture of fireproof fabrics. The fibers can be modified by the addition of small amounts of additives to the precursor composition such as polyvinylpyrrolidone to provide softer fiber or other oxide components to produce a variety of colors. These physical characteristics are in contrast to those of fibers disclosed in the prior art which are crystalline in structure. The crystalline fibers of the prior art can be friable and are not as well suited for the manufacture of textile fabrics. The fabrics prepared from fibers of the present invention are particularly well suited for consumer textiles rather than solely industrial applications as are crystalline fiber fabrics.

The ceramic fibers of the present invention are made by a non-melt process comprising shaping a mixture of viscous concentrates of precursor liquids into a fiber form and then dehydratively or evaporatively gelling or hydrolyzing the drawn or spun fibers. These fibers can subsequently be dried to provide a "green" or unfired fiber. Heating and firing the shaped green fiber removes water, decomposes and volatilizes undesired fugitive constituents, and converts it into the refractory fiber of the invention.

In this application:

"ceramic" means inorganio nonmetallic material consolidated by the action of heat, such as metal and non-metal oxides;

"sol" means a fluid solution or a colloidal suspension;

"non-melt" means that the mixture is not melted although one of the components may be;

"homogeneous" means of uniform composition;

"non-vitreous" means not formed from a melt of the oxide mixture;

"green" refers to the ceramic articles which are unfired, that is, not in their final ceramic form;

"amorphous" means a material having a diffuse x-ray diffraction pattern without definite lines to indicate the presence of a crystalline component;

"refractory" means resistant to high temperatures, e.g., up to 900°–1000° C;

"dehydrative gelling" or "evaporative gelling" mean that sufficient water and volatile material are removed from the shaped green fibers so that the form or shape of the fiber is sufficiently rigid to permit handling or processing without significant loss or distortion of the desired fibrous form or shape. Therefore, all the water in the shaped fiber need not be removed. Thus, in a sense, this step can be called partial dehydrative gelling. The shaped fibers in their green form are generally transparent to visible light and clear under an optical microscope;

"continuous fiber" means a fiber (or multi-fiber article such as a strand) which has a length which is infinite for practical purposes as compared to its diameter;

"essentially free of silica" means that any silica present in the fiber is there as an impurity, i.e., in an amount less than 0.25 weight percent of the total oxide composition, and preferably less than 0.1 weight percent;

"textile fiber" means a fiber having a soft hand suitable for the consumer market rather than heavy duty industrial textiles.

DETAILED DESCRIPTION

The present invention provides a solid, smooth, fired, refractory, amorphous homogeneous alumina-phosphorus pentoxide continuous fiber comprising 60 to 95 weight percent alumina which is in an amorphous form, and 40 to 5 weight percent phosphorus pentoxide which is also in an amorphous form.

To prepare the fibers of the invention, the aluminum and phosphorus-containing compounds which can contain soluble salts, sols or dispersible colloids or mixtures are mixed together with other optional components, such as polyvinylpyrrolidone or precursors of oxides such as copper, iron, nickel, chromium, etc. for color or other property modifications to form a homogeneous liquid precursor mixture. The components are concentrated to a fiber-forming consistency (i.e., when a rod is inserted and pulled out, a fiber is formed), by evaporation of solvent or removal of solvent from the precursor liquid mixture. To facilitate spinning of continuous fibers it is preferable that the concentrate has a viscosity in the range of 50,000 to 100,000 cps. For spinning of staple form fibers (as by use of spinning discs or blowing processes) much lower viscosities, i.e., down to 10,000 cps, are usable. Drying or removal of at least part of the water from the shaped fiber causes it to gel or become rigid. The resulting shaped "green" or non-refractory amorphous fiber can be further heated and fired at temperatures up to 1000° C (higher temperatures result in the formation of phosphates of aluminum) which removes the remaining water, decomposes and volatilizes the undesired fugitive constituents and converts it into a refractory fiber. A particularly desirable composition comprises a molecular equivalent of $4 Al_2O_3:1 P_2O_5$. At a magnification of 10,000 to 15,000 times under scanning electron microscopy, the $4 Al_2O_3:1P_2O_5$ fiber can be seen to have a thin skin or sheaf of approximately 0.1 micrometer or more.

The alumina precursor useful in the present invention can include aluminum formoacetate or an aqueous aluminum chloride solution described below. Preferably, the alumina precursor can be prepared by digesting aluminum metal foil in hot aqueous aluminum chloride solution, the alumina equivalent of the final mixture being about 20 to 23% by weight.

The phosphorus pentoxide precursors useful in the present invention can include phosphoric acid, phosphorous acid, and ammonium hypophosphite. Commercially available 85% phosphoric acid is a preferred phosphorus pentoxide precursor. The phosphorus pentoxide precursor is added to the precursor liquid as shown in Example 1.

For high carbon content (black) fibers, polyvinylpyrrolidone (PVP), present in an amount 25 to 100 parts based on dry weight PVP to 100 parts oxide equivalent (Al&P), is a preferred carbon source. The PVP polymer serves not only as the carbon source but it is also useful as the viscosity modifier for spinning purposes A convenient form for the addition of PVP is an aqueous solution with 50 weight percent K-30 TM, 40,000 molecular weight (GAF, Texas City, TX).

In terms of moles, the ratio of alumina:phosphorus pentoxide is generally in the range of 10:1 to 2:1 (i.e., 88:12 to 59:41 weight percent alumina to phosphorus pentoxide based on the total oxide composition) and these fibers can range in color from white to black. In order to obtain a preferred white fiber at an alumina/phosphorus pentoxide mole ratio of 3:1 to 5:1 (i.e., 68:32 to 78:22 weight percent alumina to phosphorus pentoxide based on the total oxide composition) with excellent textile qualities, chloride is an important ingredient. When PVP is used and where the preferred white fiber is desired, the Cl to PVP mole ratio is at least 5.5:1 to 6:1 and may be as high as 7.5:1. The chloride source can be present in the preferred aluminum oxychloride precursor (basic aluminum chloride).

The precursor liquid used to make the refractory fibers of this invention optionally can also contain various other water-soluble metal compounds (calcinable to metal oxide) which will impart additional desired properties to the refractory fibers. For example, an optional component can be used to adjust refractive index, dielectric properties, or to impart, without sacrifice of clarity, an internal color to the final refractory fiber upon being converted or oxidized to the corresponding metal oxide. Thus, ferric nitrate can be added to impart an orange to gold color, chromium formate, acetate, or trioxide to impart to the fibers a green color, cobalt acetate or nitrate to imparts a blue or lavender color, vanadyl sulfate to impart a yellow color, and nickel acetate to impart a light green to blue color. Such colored refractory fibers are desirable for the weaving of design textile fabrics. These colored filaments are also useful for color coding in ceramic fiber articles. The ferric oxide-containing refractory can be reduced in a hydrogen atmosphere to produce a cermet, black in color and attractive to a magnet. Other optional compounds are the water soluble nitrates, formates, acetates, citrates, lactates, tartrates, or oxalates of lithium, sodium, potassium, magnesium, calcium, strontium, barium, yttrium, titanium, zirconium, chromium, manganese, iron, cobalt, nickel, copper, zinc, tin, antimony, lanthanum, and vanadium as vanadyl sulfate.

The amount of such other optional metal oxide in the refractory component can vary, depending upon the property effect desired, for example the tone of the color or hue desired, but generally will comprise an amount in the range of as low as 0.05 to 0.5 and can be as much as 25 weight percent based on the total weight of the oxide components in the refractory fiber.

Each of the fiber precursor materials initially will be a relatively dilute liquid, generally containing about 10-30 weight percent equivalent oxide, which can be calculated from a knowledge of the equivalent solids in the original materials and the amount used, or determined by calcining samples of the component starting materials. For the preparation of a fiber, it is necessary to concentrate or viscosify the dilute liquid mixture of Al and P-containing precursors in order to convert it to a viscous or syrupy fluid concentrate. The concentrate will readily gel when it is fiberized and dehydrated, for example, when the concentrate is extruded and drawn in air to form the fiber. For example, the mixture can be concentrated with a Rotavapor TM (Buchi, Switzerland) flask under vacuum. The concentration procedures are well known in the art; see for example, U.S. Pat. No. 3,795,524. Sufficient concentration will be obtained when the equivalent oxide solids content is generally in the range of 25 to 55 (as determined by calcining a sample of the concentrate), and viscosities (Brookfield at ambient room temperature) are in the range of 10,000 to 1,000,000 cps, preferably 40,000 to 100,000 cps, depending on the type of fiberizing or dehyrative gelling technique and apparatus used and the desired shape of the gelled fiber. High viscosities tend to result in fibers which are more circular in cross-section whereas low viscosities (e.g., less than 50,000 cps) tend to result in fibers which are more oval or rod-like (elongated ovoid) in cross-section.

In making continuous fibers, the viscous concentrates can be extruded through a plurality of orifices (e.g., a total of 10 to 400) from a stationary head and resulting green fibers allowed to fall in the air by the force of gravity or drawn mechanically in air by means of drawing rolls or a drum or winding device rotating at a speed faster than the rate of extrusion. The concentrate can also be extruded through orifices from a stationary or rotating head and at the orifice exit blown by a parallel, oblique or tangential stream of high pressure air, such as in the making of cotton candy, the resulting blown green fibers being in essentially staple or short form with lengths generally 25 cm or less (rather than the continuous filament form) and collected on a screen or the like in the form of a mat. Any of these forces exerted on the extruded, green fibers cause attenuation or stretching of the fibers, and can reduce their diameter by about 50 to 90 percent or more and increase their length by about 300 to 1000 percent or more and serve to hasten or aid the drying of the green fibers.

The dehydrative gelling of the green fibers can be carried out in ambient air, or heated air if desired or necessary for faster drying. The drying rate assists in controlling the shape of the fiber. (It has been found that too rapid drying may cause distortion of the shape of the fiber.) The relative humidity of the drying air should be controlled since excess humidity will cause the gelled green fibers to stick together and excessively dry air tends to result in fiber breakage. Generally, air with relative humidity in the range of 20 to 60 percent at an operative temperature of 15°–30° C is most useful, although drying air temperatures of 70° C or more can be used. Where continuous green fibers are made and gathered together in parallel alignment or juxtaposition in the form of a multi-fiber strand, the fibers or strand should be treated with a size to prevent the fibers from sticking together.

The fibers in the green or unfired gel form are dry in the sense that they do not adhere or stick to one another or other substrates and feel dry to the touch. However, they still may contain water and organics, and it is necessary to heat and fire the green fibers in order to remove these remaining fugitive materials if an all oxide (carbon free) fiber is desired and convert the green fibers into refractory fibers. In certain cases it may be desirable to fire so as to retain carbon in the fiber, for example, to provide for a black color or for a high thermal emissivity fiber. In addition, useful fibers are also obtained when only part of the organics (organic residues) are removed to result in very flexible organic-inorganic hybrid fibers. As much as 25 weight percent of the fired fiber may be organic residues (e.g., C, H, O, N, etc.)

The green fibers in their continuous form are preferably gathered or collected in the form of a strand, the strand then being accumulated in a relaxed, loose, unrestrained configuration of offset or superimposed loops as in a "FIG. 8".

In firing the green fibers, care should be exercised to avoid ignition of combustible material (organics within or size upon the fiber) in or evolved from the fibers resulting in an improper rate of temperature rise of the firing cycle. Such overfiring or rapid rate of heating may result in frangible fibers. The most satisfactory schedule for firing and atmosphere control to avoid over-firing can be determined empirically.

The present invention provides continuous uniformly round, oval, rod-like (elongated ovoid) or ribbon-like, strong, flexible, smooth, glossy refractory amorphous fibers. The fibers of this invention are particularly useful in making ceramic fiber textiles not only having utility in the 500°–1000° C temperature range, but also in fire-resistant materials such as upholstery fabrics. The fabrics of the instant invention are also useful in combination with polymeric materials, for example, clear vinyls for upholstery fabrics. The fibers are also useful as fillers and reinforcement for plastic composites.

In another embodiment, as disclosed above, the present invention teaches amorphous organic-inorganic hybrid fibers comprising amorphous alumina and residual organic components. By hybrid fibers is meant fibers comprising an amorphous mixture of inorganic and organic components. In addition to an inorganic component, the fibers contain carbon and at least one of H, O, and N, and in some cases residual chloride, and they are essentially free of silica. The hybrid fibers are obtained in a non-melt process by partial pyrolysis, rather from complete pyrolysis, of the green fiber, thereby retaining residual components of the fugitive materials. The organic component is only partially pyrolyzed and has not been completely broken down to the carbon phase. The inorganic components are derived from aluminum-containing solutions or sols or mixtures thereof leading to a fiber with predominantly alumina present (i.e. 70 to 90 weight percent, preferably 70 to 85 weight percent, of the total fired hybrid fiber composition can be alumina, and 10 to 30 weight percent, preferably 15 to 30 weight percent, can be the residue from the organic components). The amount of organic residue is greater than 11 weight percent and up to 43 weight percent, preferably in the range of 17 to 43 weight percent based on the alumina component. Chlorides or other anionic components may also be present from the precursor salt components; such components are preferably present in an amount less than 5 weight percent of the fired fiber so as to minimize potential corrosion problems. The organic component is derived from the organic constituents in the aluminum precursor materials, e.g. aluminum formoacetate, added fugitive material such as polyvinyl alcohol or, preferably, polyvinylpyrrolidone, or combinations thereof. The fugitive materials contain the elements C, H, O, and N.

During the firing of the green fiber, care must be taken to avoid combustion which can result in severe degradation of the fragile or friable fibers and fiber products. This may require a controlled rate of temperature increase and/or controlled atmospheric composition. For example, oxidation may be suppressed by the addition of inert or relatively inert gases such as argon or nitrogen. Preferably, the fibers are fired to a temperature less than 700° C, preferably 400° to 600° C. The other processing details, such as the general preparation of the fiberizing concentrates, spinning, and collection or handling of resulting strands of fiber are as taught for the alumina/phosphorus pentoxide fibers.

Such hybrid fibers will normally be off-white in color to light brown or even black and may feel very much like hair. The fibers have considerable resistance to fracturing or dusting such as when abraded or rubbed continuously between the fingers.

Unless black in color (i.e. those which are off white or brown), the hybrid fibers are transparent and clear when viewed under a binocular microscope. The hybrid fibers are resistant to flame propagation; they do not sustain combustion although they may disintegrate when exposed to a flame. Because of this property the hybrid fibers can be useful as decorative fabric such as for curtains or wall coverings or the like.

Hybrid fibers or textiles when heated in a gradual manner will convert completely to the oxide form; such resultant materials being refractory alumina as is well known in the art. In general, hybrid fibers are fired from room temperature to 700° C or less over a time period of one hour or less when firing is carried out in an air atmosphere so as to retain residual organic.

Objects and advantages of this invention are further illustrated by the following examples, but the particular materials and amounts thereof recited in these examples, as well as other conditions and details, should not be construed to unduly limit this invention. All percents and parts are by weight unless otherwise stated.

In the Examples below:

"22.69 wt% alumina sol" is the Al-aluminum chloride sol prepared by digesting aluminum foil (Kaiser Aluminum Co.) in the solution of $AlCl_3 \cdot 6H_2O$ which was dissolved in deionized water then heated to about 85°–90° C and maintained at this temperature until all of the foil was completely digested.

The "20.5 wt% alumina sol" is also an Al-AlCl$_3$ sol, prepared as above, but the aluminum foil was made by Reynolds Aluminum Co.

The PVP[K-30] is a 50% aqueous solution prepared by dissolving the PvP[K-30]powder in deionized water in a 1:1 weight ratio. In all examples, PVP is shown as that amount added to 100 parts equivalent oxide composition of the fired fibers.

EXAMPLE 1

An alumina precursor was made by digesting aluminum metal foil in hot aqueous aluminum chloride solution. To 196.5 grams of the alumina precursor containing an equivalent of 40.9 grams of $Al_2O_3$ was added 23.1 grams of 85% phosphoric acid. The final mixture had an alumina equivalent of 18.6 wt%. To this liquid mixture, 36.6 grams of a 50 weight percent aqueous solution of polyvinylpyrrolidone (K-30) was added with stirring. The fiber precursor comprised 3 parts by weight of a molecular equivalent of $4Al_2O_3 : 1P_2O_5$ and 1 part by weight of PVP (dry basis).

The resultant dispersion was filtered through a 0.3 micrometer Balston ™ cartridge filter (Balston, Inc., Lexington, MA) and concentrated in a Rotavapor flask to a viscosity measured to be 68,000 cps Brookfield. The concentrate was spun through a 30 hole spinnerette having 102 micrometer diameter holes and using a pressure of 1.38 MPa (200 psi) [1 psi =6900 Pa]. The filaments were drawn downward at a linear rate of 82.2 meters/min (270 ft/min) through a vertical cylinder 1.2 meters (4 ft) long by 17.8 cm (7 inches) diameter. Dry room temperature air was passed upward through the cylindrical stack at about 1.42 L/sec (3 cfm). Infra red lamps were directed at the fibers as they were collected on a 61 cm (24 inch) drum to assist sufficient drying to prevent the fibers from sticking together.

A part of the fiber bundle which was cut at one point, was removed from the drum and was suspended in a 50° C oven for further drying. These fibers which were dried at fifty degrees were divided into five parts and fired from 50° C to various higher temperatures. The resulting data are tabulated in TABLE I, below.

TABLE I

| Temperature | Time to reach temp. from room temp. | Results |
| --- | --- | --- |
| 600° C. | 1 hour | clear gold 10 micrometer dia. strong, shiny, smooth, soft, and transparent |
| 700 | 1 hr., 20 min. | off-white, otherwise like 600° C. fibers |
| 800 | 1 hr., 35 min. | slightly off-white, otherwise like above |
| 900 | 2 hours | white to the eye, otherwise as above |
| 1000 | 2 hrs., 30 min. | white, translucent, dull, weak and friable |

X-ray diffraction data indicated that all the fibers fired at temperatures ranging from 600° to 900° C were amorphous. The fibers which were fired at 1000° C were crystallized to $AlPO_4$ and eta or gamma alumina. The tensile strength of the 900° C fibers was 1.3 GPa (190,000 psi) and the modulus of elasticity was 135 GPa (19.5 million psi).

EXAMPLE 2

98 weight percent colored $Al_2O_3$–$P_2O_5$ fibers (4 $Al_2O_3$ : 1 $P_2O_5$ )+2% CoO In a 100 ml beaker, the following materials were mixed together using a magnetic stirrer.
1. 37.41 g Al-AlCl$_3$ sol*
2. 4.2 g $H_3PO_4$
3. 6.0 g PVP (K-30), 50% by wt. aqueous solution, so as to provide 3g PVP or 30 parts PVP to 100 parts oxide equivalent
4. 0.67 g $Co(CH_3COO)_2 \cdot 4H_2O$ dissolved in 30 mL deionized water.

* Al-AlCl$_3$ sol is made by digesting Al foil in hot aqueous solution (85°–90° C) of AlCl$_3$. The $Al_2O_3$ equivalent was 19.8% by wt.

The resulting mixture was pressure-filtered at 0.1–0.14 MPa (15 to 20 psi) through a 0.3 micrometer Balston filter cartridge and a 1 micrometer Millipore ™ filter (Millipore Corp., Bedford, MA) into a 100 mL round bottom flask. The mixture was then concentrated in a rotating evacuated flask (40° C water bath and 28–29 inches [711–737 mm Hg vacuum]) to a viscosity of about 75,000–80,000 cps. This clear pinkish-blue sol concentrate was extruded through a 102 micrometer diameter-80 hole spinnerette at 1.04 MPa (150 psi). Fibers were drawn downward and collected on a wheel at a linear speed of 80 fpm [24 meters/min]. The spinning chamber was heated by heat lamps mounted along the falling path of fibers. The ambient relative humidity was about 45–50%.

The bright blue fibers obtained were fired from room temperature to 600° C in 1 hour; 600°–700° C in 20 minutes; 700°–800° C in 15 minutes, then cooled to about 500° C. The fired fibers were removed from the furnace. The fibers were light blue in color and transparent. They were soft textured, strong, shiny and smooth.

Example 3

Using the procedure of Example 2, to 71.08 g (19.83 percent alumina equiv.) of a mixture of Al-AlCl$_3$ sol, and 7.97 g $H_3PO_4$, was added 3.34 g of nickel acetate (to give a 5% NiO equivalent) and 12.0 g of 50 Wt% aqueous PVP solution. The fiber precursor was concentrated to 75–80,000 cps and spun into fibers using the procedure of Example 2. The fibers were fired up to 800° C, then to 900° C. These fibers were brown colored and very strong with a soft texture. Some of the fibers were then fired to 1000° C. These fibers were light green in color and were very fragile/friable.

In Examples 4 to 15 alumina-phosphorus pentoxide fibers were made by the following basic procedure. The order of addition of raw materials to prepare the spinning sol is as listed. This group of samples was prepared to establish the effect of chlorine on the final product, the effect of the polyvinylpyrrolidone, molar ratios, additives, and raw material source.

EXAMPLE 4

10 $Al_2O_3$ : 1 $P_2O_5$

In a beaker the following materials were mixed together:
1. 77.4 g of 22.69 wt% alumina sol.
2. 11.77 g concentrated HCl acid.
3. 4.0 g phosphoric acid, concentrated.
4. 12.0 g PVP [K-30] 50 percent aqueous solution.

The mixture was filtered through a 0.3 micrometer Balston cartridge filter and a 1 micrometer Millipore filter, and concentrated in a Rotovapor to a viscous sol of about 90,000 cps. The viscous sol was then extruded through a 40-hole 102-micrometer diameter orifice spinnerette. Filaments were drawn and collected at 30 meters per minute. The extruded fibers were then fired immediately by draping them over a ceramic rod in a furnace equipped with a programmed temperature control.

The firing schedule was:
room temperature to 600° C in 1 hour,
600 to 700° C in the next 20 minutes,
700°–800° C in the final 20 minutes,
then cooled to room temperature. The fired fibers were removed from the furnace, they were white, transparent and fairly strong.

EXAMPLE 5

2 $Al_2O_3$:1 $P_2O_5$ 1. 52 g of Al-aluminum chloride sol having an equivalent alumina content of 22.69 wt%.
2. 7.9 g of concentrated HCl
3. 13.34 g of concentrated phosphoric acid.
4. 12.0 g of 50 wt percent aqueous solution PVP [K-30].

The sol viscosity was 95,000 cps, spinning was performed in a spinnerette having forty 102-micrometer diameter orifices with a draw rate of 25 meters per minute wheel speed. The fibers were fired to 800° C and were black, shiny, soft and strong.

EXAMPLE 6

98 weight percent 4 $Al_2O_3$:1$P_2O_5$ + 2 weight percent iron oxide [$Fe_2O_3$].

1. 37.41 g Al-aluminum chloride sol [19.83 wt percent alumina]
2. 4.2 g conc. phosphoric acid
3. 6.0 g 50% aqueous PVP [K-30]
4. 0.68 g of $FeCl_3.6H_2O$ was dissolved in 30 mL deionized water and then stirred into the mixture of 1-3 above.

The sol was concentrated to a viscosity of 76,000 cps and was spun through a 40 hole spinnerette having 76 micrometer diameter orifices.

The "green" fibers were fine, curly and a light orange color. The fibers fired to 800° C were fine, curly and pinkish in color.

Example 7

100 weight percent Alumina 1. 100 g of [22.69 wt percent alumina] Al-aluminum chloride sol
8.93 g of 50 wt percent aqueous solution of PVP [K-30]

The sol was concentrated to a viscosity of 120,000 cps and spun from a 40 hole spinnerette having 76 micrometer diameter orifices. Fibers were drawn and collected at a linear rate of about 12 meters per minute. The fibers fired to 800° C, were white in color but stiffer than the alumina-phosphorus pentoxide fibers.

EXAMPLE 8

Using the procedure of Example 4, fibers having the formulations shown in TABLE II were prepared with the concentrated sols having viscosities of about 100,000 cps.

TABLE II

| Sample | Al:AlCl₃ sol* 20.5% Al₂O₃ | H₃PO₄ acid | HCl conc | PVP [K-30] 50% aq.soln | Cl:PVP ratio |
|---|---|---|---|---|---|
| | | Chloride: PVP Ratio | | | |
| 8A | 36.20 g | 4.2 g | 5.50 g | 6.0 g | 7:1 |
| 8B | 36.20 g | 4.2 g | 0.00 g | 4.0 g | 7:1 |

*sol from Reynolds ™ Al foil

Both fibers were heat treated to 800° C at the same time in the same furnace under the same conditions. Both fibers were clear, white and soft. The 8B sample was slightly stiffer than 8A (less PVP content). As the samples aged in air, they became softer to the hand. The fired fibers had an $Al_2O_3$:$P_2O_5$ ratio of 4:1.

EXAMPLES 9-11

Using the procedure of Example 4, fibers having the formulations shown in TABLE III were prepared from sol concentrates having viscosities of about 100,000 cps.

These six samples were prepared using the same amount of phosphoric acid, 8.4 g and 12.0 g of 50 percent aqueous PVP [K-30]. The data is shown in Table III below.

TABLE III

| | Effect of Chloride Content on Color | | | | |
|---|---|---|---|---|---|
| Sample | Al—AlCl₃ grams | HCl grams | Cl from HCl | Cl from Al—AlCl₃ | Total Cl moles | Color* |
| 9A | 65.4** | 3.27 | 1.16 | 8.44 | 0.270 | tan |
| 9B | 65.4** | 6.54 | 2.32 | 8.44 | 0.303 | beige |
| 10A | 72.4*** | 7.24 | 2.57 | 9.34 | 0.335 | off white |
| 10B | 72.4*** | 3.62 | 1.29 | 9.34 | 0.300 | tan |
| 11A | 72.4*** | 5.40 | 1.92 | 9.34 | 0.317 | beige |

TABLE III-continued

| | Effect of Chloride Content on Color | | | | |
|---|---|---|---|---|---|
| Sample | Al—AlCl$_3$ grams | HCl grams | Cl from HCl | Cl from Al—AlCl$_3$ | Total Cl moles | Color* |
| 11B | 65.4** | 8.40 | 2.98 | 8.44 | 0.322 | white |

*color of fibers fired to 800° C.
**sol from Kaiser ™ Al foil
***sol from Reynolds ™ Al foil concentrated HCl (36.5%)

The data show that a mole ratio of about 5.5:1 to 6:1 Cl to PVP was required to obtain the white fibers. The mole ratio was calculated on the basis of the PVP monomeric unit of a 111 molecular weight. The molecular ratio of Al$_2$O$_3$:P$_2$O$_5$ in the fired fiber was calculated to be 4:1.

EXAMPLE 12

Two alumina-phosphorus pentoxide fibers having the mol ratios shown in TABLE IV were prepared using the procedure of Example 4. The fibers were fired from room temperature to 800° C over a period of 1 ⅔ hours. The fibers had the properties shown in Table IV below.

TABLE IV

| | Varying Alumina-Phosphorus Pentoxide Ratio | | | |
|---|---|---|---|---|
| Sample | Composition | Raw Materials | Additive | Properties |
| 12A | 10 Al$_2$O$_3$:P$_2$O$_5$ (87.8:12.2 wt %) | Al—AlCl$_3$ H$_3$PO$_4$ | HCl 30% PVP | off-white transparent, strong |
| 12B | 2 Al$_2$O$_3$:1 P$_2$O$_5$ (59:41 wt %) | Al—AlCl$_3$ H$_3$PO$_4$ | HCl 30% PVP | black, shiny soft, strong |

EXAMPLE 13

Three colored fiber lots were prepared using various additives and using the procedure of Example 4, in which the Al$_2$O$_3$:P$_2$O$_5$ molecular ratio was 4:1. The source of alumina was Al AlCl$_3$ sol; the source of P$_2$O$_5$ was H$_3$PO$_4$ (85%). PVP, 30% (50% aqueous solution) was added to the liquid precursor in all samples. The data is given in TABLE V below.

TABLE V

| Sample | Composition | Additive | Firing temp. | Properties |
|---|---|---|---|---|
| 13A | 95%, 4 Al$_2$O$_3$:1 P$_2$O$_5$ 5% NiO | nickel acetate.4 H$_2$O | 700° C. | dark brown, strong |
| | | | 800° C. | soft brown. strong |
| | | | 900° C. | brown |
| | | | 1000° C. | bluish, friable |
| 13B | 98%, 4 Al$_2$O$_3$:1 P$_2$O$_5$ 2% Fe$_2$O$_3$ | FeCl$_3$ .6 H$_2$O | 800° C. | fine, curly, pinkish |
| 13C | 98%, 4 A$_2$O$_3$:1 P$_2$O$_5$ 2% CoO | cobalt acetate.4 H$_2$O | 800° C. | blue, transparent |

EXAMPLE 15

Using the procedure of Example 4, five fiber lots were prepared having varying alumina and phosphorus pentoxide sources, and with and without PVP. The data is shown in TABLE VI below.

TABLE VI

| | | Alumina-phosphorus pentoxide fibers | | | |
|---|---|---|---|---|---|
| | Ratio | | Composition | Firing temp. | Properties |
| F | 4:1$^a$ | Niacet$^b$ | AHP$^c$ No PVP$^d$ | 1000° C. | Black, soft, strong, shiny or glossy$^g$ |
| G | 4:1 | Niacet | AHP 30% PVP | 600° C. | Black, curly |
| | | | | 700° C. | black, curly, weak |
| H | 4:1 | Al—AlCl$_3$$^e$ | H$_3$PO$_4$ No PVP | 600° C. | Lt. Brown, dull, weak |
| | | | | 700° C. | Lt. Yellow, friable |
| I | 4:1 | Al—AlCl$_3$ | H$_3$PO$_4$ 30% PVP | 600° C.$^f$ | Brown, shiny, strong |
| | | | | 700° C. | Beige, shiny, strong |
| | | | | 800° C. | Off-white, shiny, strong |
| | | | | 900° C. | Off-white, shiny, strong |
| | | | | 1000° C. | Off-white, shiny, strong |
| J | 4:1 | Al—AlCl$_3$ | H$_3$PO$_4$ 100% PVP | 700° C. | Black, shiny, strong |

TABLE VI-continued

| | Alumina-phosphorus pentoxide fibers | | |
|---|---|---|---|
| Ratio | Composition | Firing temp. | Properties |
| | | 800° C. | Black, shiny, strong |

[a] 4:1 ratio is 4 $Al_2O_3$: 1 $P_2O_5$
[b] Niacet: aluminum formoacetate
[c] AHP: ammonium hypophosphite
[d] PVP: polyvinylpyrrolidone (K-30) parts by weight based on 100 parts by weight oxide equivalent
[e] Al—$AlCl_3$: sol derived from aluminum digested in aluminum trichloride aqueous solution
[f] Fiber contained about 18 percent organic residue
[g] Carbon content of 16.4 to 17.9 was found by analysis of several samples

EXAMPLE 16

A fiber sample was prepared using the procedure of Example 7 except the precursor sol comprised 20.7 weight percent equivalent alumina An aluminum formoacetate solution was prepared from 40g Niacet in 70 g water at 70° C. This solution was stirred into 200 g. of the alumina sol. Thirty-six g of 50% solution of PVP was stirred into the sol solution mixture. This mixture was concentrated in a Rotavapor to 88,000 cps. After standing, the viscosity increased to 232,000 cps. The fiberizable concentrate contained 24.4% alumina equivalent by weight.

Spinning into fibers was accomplished by extruding at a pressure of 4 MPa (580 psi) through a stainless steel die with forty 75-micrometer diameter holes. Drawing the extruded filaments through a dryer (27°–32° C) at a linear rate of 54 m/min (180 feet/min.) resulted in fiber that was then drawn together in a strand and deposited randomly in a stainless steel belt moving continuously through 4.2 meter (14 foot) long kiln. The strands passed through the kiln over a 20 min. period of time and reached a maximum temperature of 600° C for several minutes. The 600° fibers were amorphous. The resultant fibers were light brown in color, transparent and clear under the microscope and felt very much like hair. They could be abraded continuously through the fingers without dusting. They had a tensile strength of 1.7 GPa (250,000 psi). The diameter of the fired fibers was 11 to 12 micrometers.

Calcination of the fibers at 620° C for 15 min. caused them to lose 21 percent of their weight which indicated a fugitive content of at least 21 weight percent. After firing to 700° C the fibers were white and they no longer had a soft quality.

EXAMPLE 17

Alumina fibers were prepared from Al-aluminum chloride sol and PVP [K-30] only. A fiber sample was prepared using the procedure of Example 7 except the aluminum chloride sol contained 22.57 wt percent alumina equivalent. Into 150.0 g of this sol was stirred in 22.0 g PvP [K-30] 50 wt percent aqueous solution. The sol mixture was concentrated to a viscosity of 120,000 cps and spun from an 80 hole, 76 micrometer hole diameter spinnerette. The fibers were collected on a wheel at a rate of about 10 meters per minute. The unfired fibers were divided into five bundles to be heat treated from room temperature to 400, 500, 600, 650, and 700° C; one bundle was removed from the furnace at each temperature listed.

The 400° C fixed fibers were glossy black, friable but handleable, and contained about 26 wt percent fugitive material.

The 500° C fibers were dark brown, fairly strong as a bundle, shiny, and contained about 13.5 wt percent as fugitive material.

The 600° C fibers were light brown, clear, fairly strong and contained 3.3 wt percent as fugitive material.

The 650° C fibers were light beige, transparent, shiny, and strong.

The 700° C fibers were off-white, shiny, transparent and strong.

All of these fiber samples were soft but they were not as soft as the alumina phosphorous pentoxide fibers. They became softer when aged at room temperature.

Various modifications and alterations of this invention will become apparent to those skilled in the art without departing from the scope and spirit of this invention, and it should be understood that this invention is not to be unduly limited to the illustrative embodiments set forth herein.

I claim:

1. An amorphous organic-inorganic hybrid fiber consisting essentially of 70 to 90 weight percent alumina and 10 to 30 weight percent of organic residue based on the total hybrid fiber composition, wherein said fiber contains alumina, carbon, and one element or group of elements selected from the group consisting of H, O, N, and Cl.

2. The fiber according to claim 1 wherein said alumina is present in an amount of 70 to 85 weight percent and said organic residue is present in an amount of 15 to 30 weight percent.

3. The fiber according to claim 1 wherein said organic residue consists of carbon and atoms selected from the group consisting of H, O, and N atoms.

4. The fiber according to claim 1 wherein said organic residue is derived from polyvinylpyrrolidone.

5. The fiber according to claim 1 wherein said organic residue is derived from polyvinyl alcohol.

6. The fiber according to claim 1 wherein said organic residue is derived from polyvinylpyrrolidone and aluminum formoacetate.

7. The fiber according to claim 1 wherein said organic residue is derived from polyvinyl alcohol and aluminum formoacetate.

8. The fiber according to claim 1 wherein said organic residue is derived from aluminum formoacetate.

9. The fiber according to claim 1 which is transparent.

10. The fiber according to claim 1 wherein said element or group of elements is an anionic radical in an amount in the range of greater than zero and up to less than 5 weight percent.

11. The fiber according to claim 1 wherein said organic residue is present in an amount in the range of 11 to 43 weight percent based on the alumina component.

12. The fiber according to claim 11 wherein said organic residue is present in an amount in the range of 17 to 43 weight percent.

* * * * *